United States Patent [19]

Ausnit

[11] 4,196,030
[45] Apr. 1, 1980

[54] METHOD OF MAKING EXTRUDED CONSTRUCTION FOR BAGS

[75] Inventor: Steven Ausnit, New York, N.Y.

[73] Assignee: Minigrip, Inc., Orangeburg, N.Y.

[21] Appl. No.: 878,610

[22] Filed: Feb. 16, 1978

Related U.S. Application Data

[63] Continuation-in-part of Ser. No. 754,745, Dec. 27, 1976, abandoned.

[51] Int. Cl.² .............................................. B65D 35/08
[52] U.S. Cl. ........................................ 156/91; 53/412;
53/416; 156/92; 156/244.11; 156/244.13;
156/244.24; 222/92; 222/107; 222/527;
222/528; 222/529; 222/530; 222/536
[58] Field of Search ...................... 156/91, 92, 244.11,
156/244.13, 244.24; 53/29; 150/3, 42, 44;
138/118; 222/92, 107, 527, 528, 529, 530, 535

[56] References Cited

U.S. PATENT DOCUMENTS

| Re. 26,991 | 11/1970 | Luca ........................................ 264/95 |
| Re. 29,331 | 8/1977 | Naito ....................................... 156/92 |
| 3,380,481 | 4/1968 | Kraus ...................................... 138/118 |
| 3,746,215 | 7/1973 | Ausnit et al. ............................ 222/92 |
| 3,945,872 | 3/1976 | Noguchi ................................. 156/498 |

Primary Examiner—Caleb Weston
Attorney, Agent, or Firm—Hill, Van Santen, Steadman, Chiara & Simpson

[57] ABSTRACT

A method of making an extruded construction for bags, comprising forming in an integral one piece plastic extrusion a flexible collapsibly foldable thin wall closure web area joined at its opposite ends to proximal ends of a pair of pull flange portions of substantial length, and as part of the extrusion forming separable resiliently flexible interlocking complementary fastener profiles adjacent to said proximal ends; collapsibly folding the closure web area away from the flange portions and the profiles, coupling the fastener profiles together, and enveloping the collapsibly folded closure web area within bag body side wall panels having end parts joined to the extrusion adjacent to the profiles. The side wall panels may be extruded integrally with the closure web area, the flange portions and the fastener profiles; or the side wall panels may be separately formed and sealed to the collapsibly folded closure web area or the flange portions adjacent to the profiles. The profiles may be extrusion molded on the pull flange portions or may be extrusion molded on the closure web area closely adjacent to the pull flange portions or may, in effect, be extrusion molded to the pull flange portions and the closure web area where they join together. Especially where the profiles are on the pull flange portions, the profiles may be efficiently cooled from both sides of the respective flange portions following the extrusion.

The collapsibly folded closure web area may be formed into a funnel spout element for each bag or may serve simply as a hermetic seal until it is desired to open the associated bag which has been formed by hermetically sealing as necessary along edges of the side wall panels.

22 Claims, 19 Drawing Figures

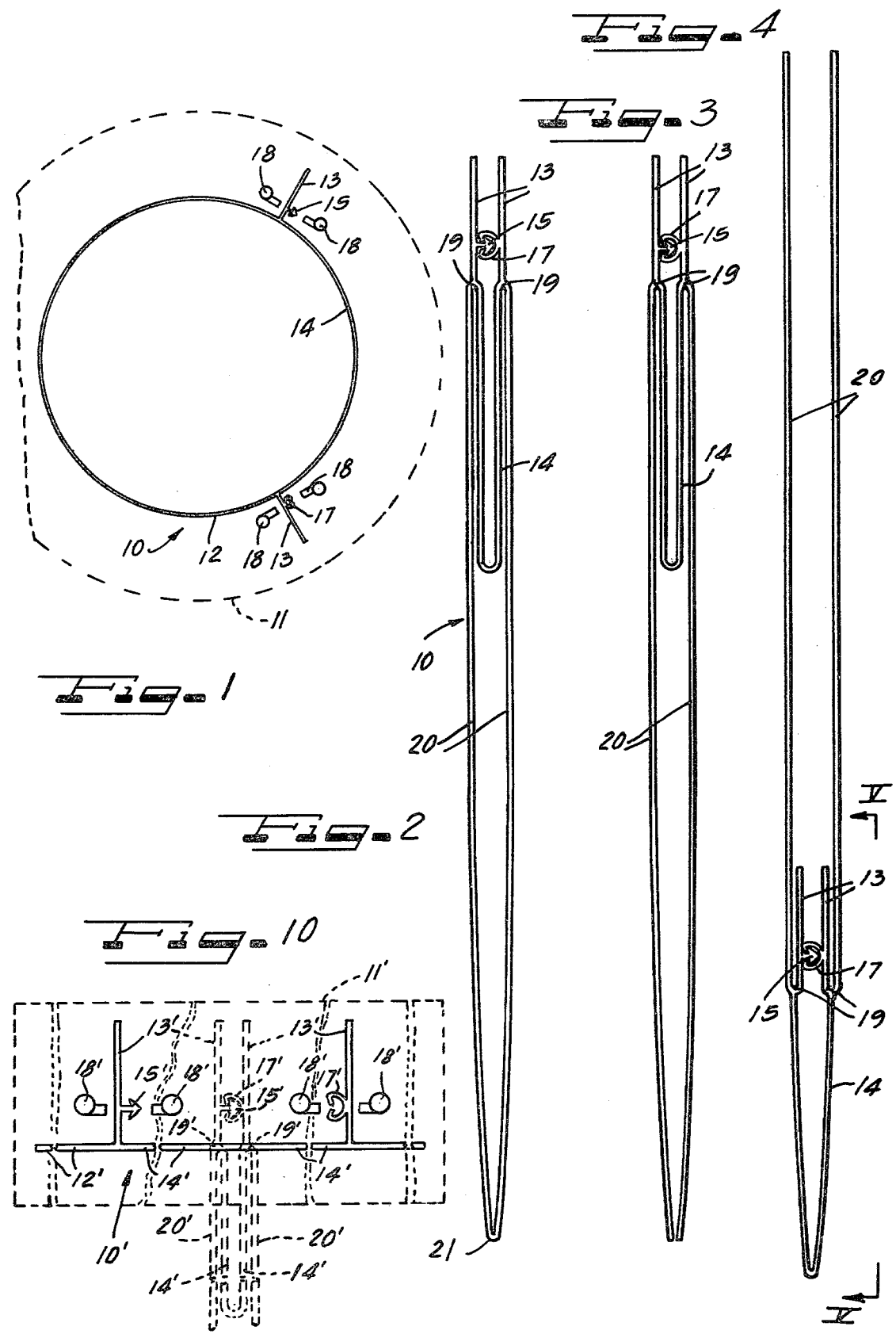

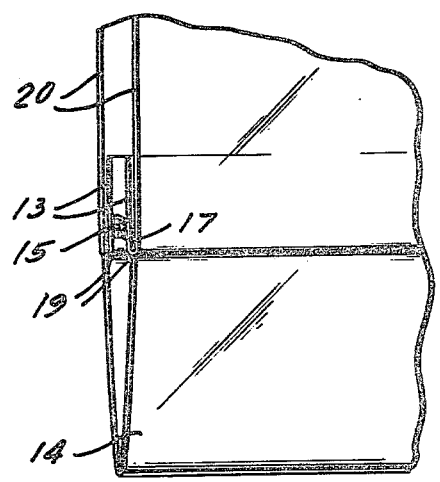
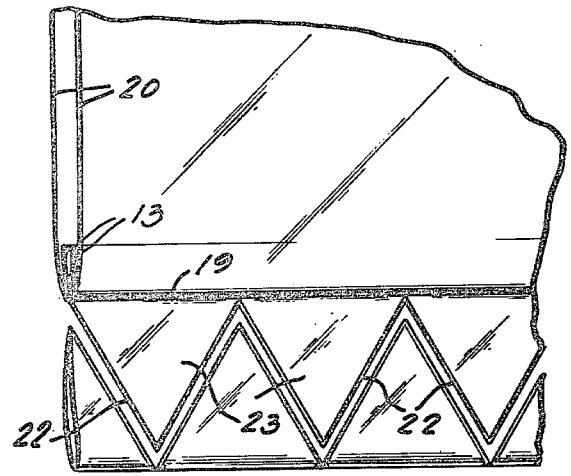
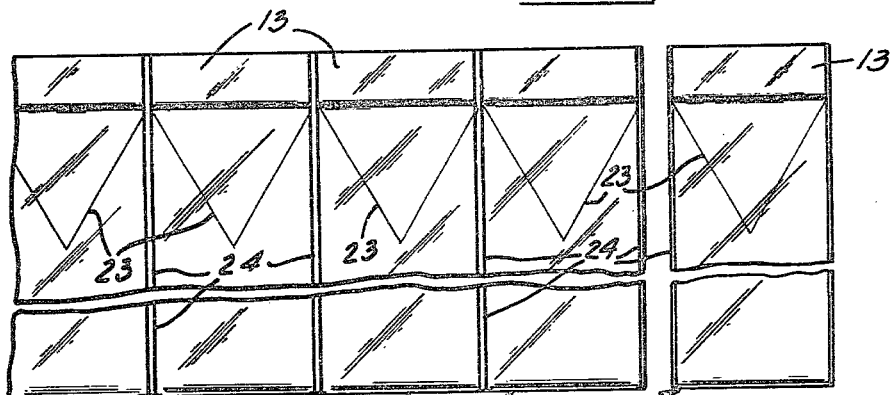
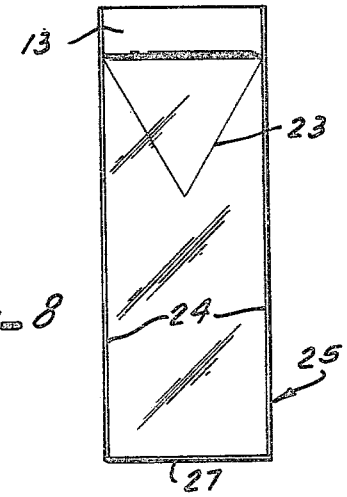
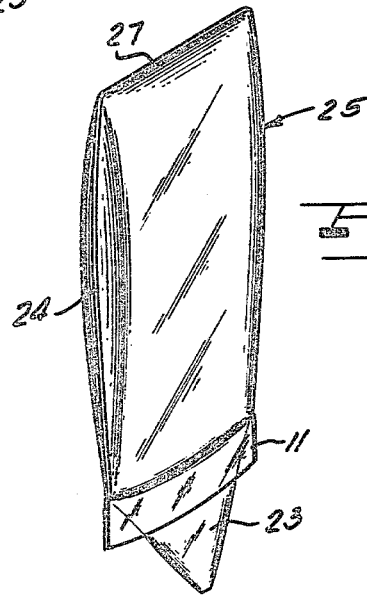

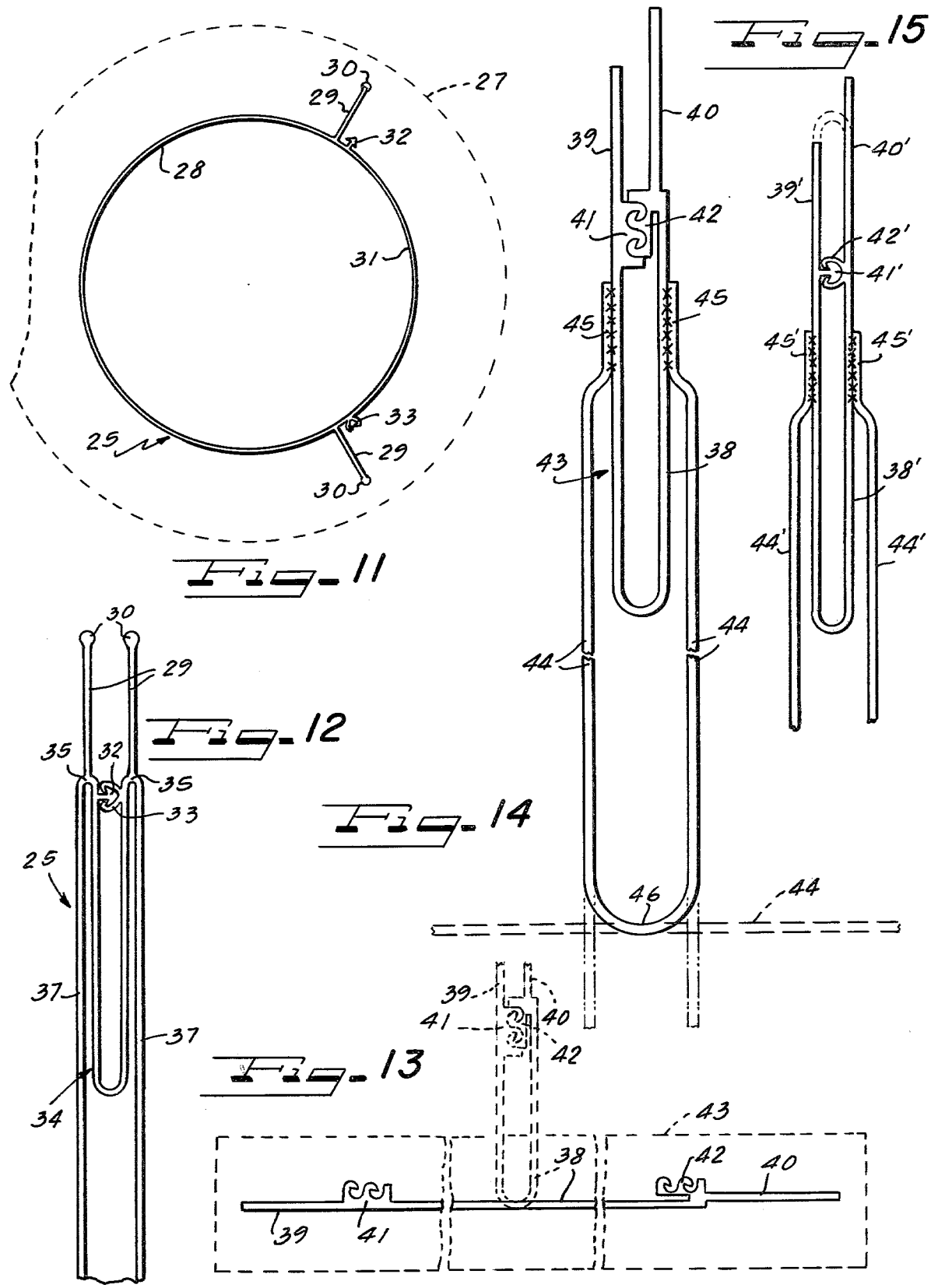

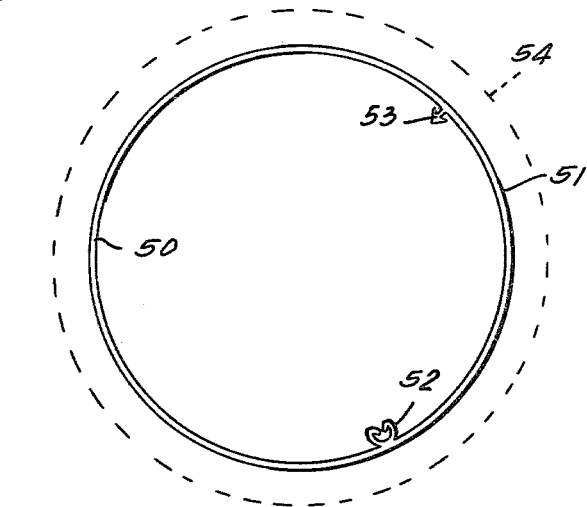
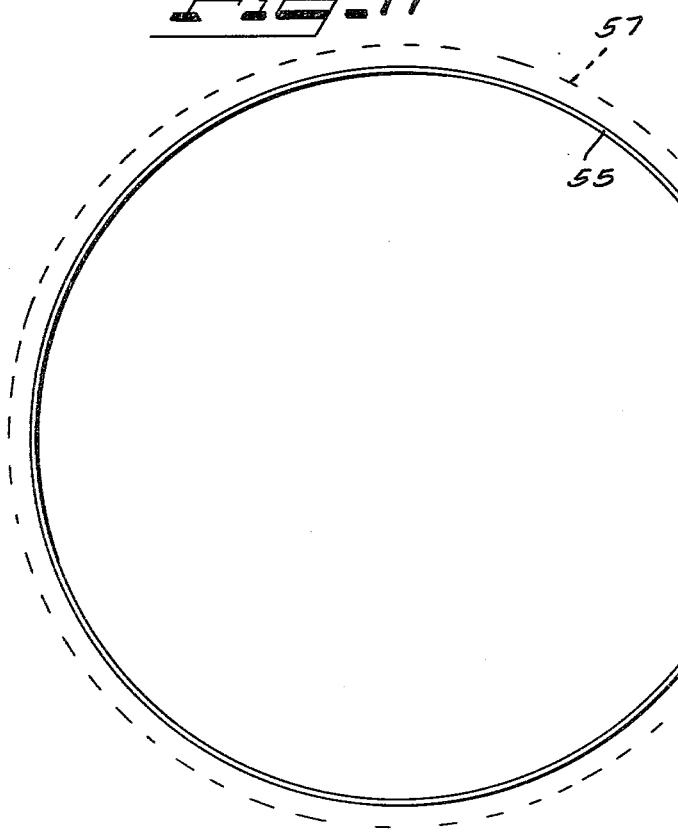
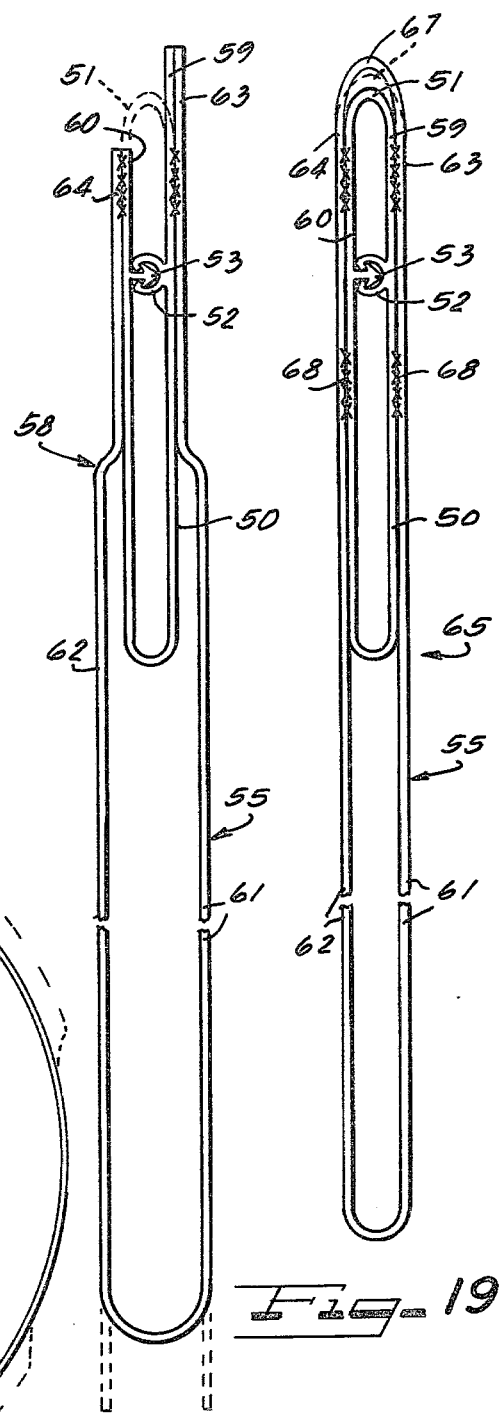

METHOD OF MAKING EXTRUDED CONSTRUCTION FOR BAGS

RELATED APPLICATION

This application is a continuation-in-part of my application Ser. No. 754,745, filed Dec. 27, 1976, now abandoned.

BACKGROUND OF THE INVENTION

This invention relates to improvements in extruded construction for bags, and is more particularly concerned with a construction especially suitable for reclosable bags which are adapted to be initially hermetically sealed and which after being opened are reclosable.

A wide variety of products from foodstuffs to hardware and materials in liquid or granular form are desirably packaged in flexible plastic bags which may or may not be transparent or at least translucent. With certain types of packaged contents, it is desirable to provide means preventing unauthorized access to the contents or to prevent spillage. Often the contents must remain hermetically sealed until used. With pourable contents, whether liquid or particulate, it is often desirable to have the bags equipped with pouring spout means. A type of bag which is especially suitable for these purposes is disclosed in U.S. Pat. No. 3,746,215. However, the bags disclosed therein are constructed from a plurality of separately formed parts secured together in a manner that complicates and increases cost of manufacture because of the particular multi-part fabrication and the necessary assembling and securing together of such parts.

A principal aim of the present invention is to provide a new and improved simplified, efficient method of making integral extruded bag construction by which at least a major structure of the bags can be produced in one integral extruded piece. Tubular extrusions for manufacture of bags are disclosed, for example, in U.S. Pat. Nos. Re. 29,331, Re. 26,991 and U.S. Pat. No. 3,380,481. Although those patents disclose the integral extrusion of film and of separable zipper type resiliently flexible fasteners, they fail to have any provision for a combination closure and hermetic sealing gusset means which may if desired also provide pouring spout means.

SUMMARY OF THE INVENTION

It is, accordingly, an important object of the present invention to provide a new and improved method of making an extruded construction for reclosable bags which comprises by means of a single one piece plastic extrusion forming, a flexible, collapsibly foldable thin wall closure web area, a pair of pull flange portions and interlocking complementary fastener profiles, and with which bag side wall panels may be integrally extruded or separately formed and joined thereto.

Another object of the invention is to provide a new and improved method of making an integral extruded construction which contains in one integral part all of the elements needed for a complete specialized bag structure.

A further object of the invention is to provide a new and improved method of making an extruded construction for bags.

Still another object of the invention is to provide a new and improved method of making special type reclosable bags.

In various embodiments of the invention there is provided a new and improved method of making an extruded construction for bags, comprising forming in an integral one piece plastic extrusion a flexible collapsibly foldable thin wall closure web area joined at its opposite ends to proximal ends of a pair of pull flange portions of substantial length, and as part of the extrusion forming separable resiliently flexible interlocking complementary fastener profiles adjacent to said proximal ends; collapsibly folding the closure web area away from the flange portions and the profiles, coupling the fastener profiles together, and enveloping the collapsibly folded closure web area within bag body side wall panels having end parts joined to the extrusion adjacent to the profiles. The side wall panels may be extruded integrally with the closure web area, the flange portions the fastener profiles, or the side wall panels may be separately formed and sealed to the collapsibly folded closure web area or the flange portions adjacent to the profiles. The profiles may be extrusion molded on the pull flange portions, or may be extrusion molded on the closure web area closely adjacent to the pull flange portions, or may, in effect, be extrusion molded to the pull flange portions and the gusset where the they join together. Especially where the profiles are on the pull flanges, the profiles are efficiently cooled from both sides of the respective flange portions following the extrusion.

The collapsibly folded gusset may be formed into a funnel spout element for each bag or may serve simply as a hermetic seal until it is desired to open the associated bag which has been formed by hermetically sealing as necessary along edges of the side wall panels.

BRIEF DESCRIPTION OF THE DRAWINGS

FIG. 1 is a schematic illustration of a method of extruding, and initial treatment of, an integral extruded construction for bags according to the present invention, in this instance comprising a tubular extrusion.

FIG. 2 is an enlarged vertical detail view showing the extrusion as formed in FIG. 1, collapsed into a bag configuration.

FIG. 3 is a view similar to FIG. 2, but showing the lower fold joint of the side wall panels sliced open.

FIG. 4 is a view similar to FIG. 3 but showing the wall panels folded back to expose the infolded closure web area between the profile-carrying, separating flanges.

FIG. 5 is a reduced scale fragmentary plan view taken substantially in the plane of line V—V of FIG. 4.

FIG. 6 is a plan view similar to FIG. 5, but showing how the infolded gusset is formed into funnel spout shape.

FIG. 7 is a fragmental plan view similar to FIG. 6 but showing the side walls folded back to original position and illustrates steps in transverse sealing of the collapsed extrusion construction into individual bags.

FIG. 8 is an elevational view of a fully sealed bag.

FIG. 9 is an elevational view of the bag inverted and the combination closure web or gusset and funnel spout extended for pouring from the bag.

FIG. 10 is a schematic illustration of another method of extruding, and initial treatment of, an integral extruded construction for bags according to the present invention, in this instance comprising a substantially flat extrusion.

FIG. 11 is a schematic illustration of a method of extruding an integral extruded construction for bags according to the present invention wherein the fastener profiles are extruded integrally with the gusset web area between the pull flange portions.

FIG. 12 is an enlarged vertical detail view showing the extrusion as formed in FIG. 11, collapsed into a bag configuration.

FIG. 13 is a fragmental, schematic illustration of a further method of extruding an integral construction for bags according to the present invention and showing how the same is collapsed to provide an infolded gusset and closure for reclosable bags.

FIG. 14 is an enlarged fragmental vertical detail view showing a bag structure embodying the construction of FIG. 13.

FIG. 15 is a fragmentary transverse detail view of a modification in a bag similar to the bag configuration of FIG. 14.

FIG. 16 is a schematic illustration of the method according to the present invention of integrally extruding a combination gusset web, pull flange portions and fastener profiles in tubular fashion.

FIG. 17 is a schematic illustration of extruding a tubular bag side wall construction.

FIG. 18 is an enlarged vertical view of a bag structure which may embody the extrusion of FIG. 16; and FIG. 19 is an enlarged vertical detail view showing a bag structure embodying the extrusions of both of FIGS. 17 and 18.

DESCRIPTION OF PREFERRED EMBODIMENTS

As illustrated in FIG. 1, an integral extrusion construction 10 for bags is adapted to be formed by extrusion of suitable thermoplastic material, utilizing any preferred extrusion process and equipment, which may conveniently be substantially according to that disclosed in U.S. Pat. No. Re. 26,991 in which the extrudate is forced from an extruder, schematically identified as 11, through an annular die opening to provide a thin tubular film or web 12, the inside of the extruded tube being pressurized by means of air to keep it from collapsing and to obtain cross gain orientation of the material. To any extent necessary the disclosure of said U.S. Pat. No. Re. 26,991 is embodied herein by reference.

On the outside of the substantial diameter extruded tubular plastic web 12 there are integrally formed in one piece with the web 12 in the extrusion process two substantially circumferentially spaced, longitudinally extending, angularly radially outwardly projecting flange portions 13 of substantial width and which are adapted ultimately to provide separating or opening or pull flanges for bags to be fabricated from the extruded construction 10. In the extruded tubular configuration, the flanges 13 have their proximal edges integrally joined with the web 12 and are disposed in generally diverging relation with a flexible, collapsibly foldable closure web area 14 of the tubular web 12 between the flanges. In one practical form, the web area 14 comprises about one third of the circumference of the tube so that the remaining substantially two thirds of the circumference remains to provide the wall panels of the body portions of bags to be fabricated from the extrusion.

On their generally opposing faces, the flanges 13 are provided with separable zipper type resiliently flexible fastener means comprising a male profile 15 integrally formed by extrusion on one of the flanges 13 and a receptive complementary female profile 17 integrally formed by extrusion on the other of the flanges 13. Desirably the profiles 15 and 17 are located in adjacently spaced relation to the tubular web 12, with substantial width free portions of the flanges 13 extending outwardly beyond the profiles.

As extruded, the thin tubular web 12 is cooled to maintain its form. In order to cool the profiles 15 and 17 which are necessarily of larger mass than that of the adjacent body of the web 12, means such as nozzles 18 are provided for impinging from opposite sides of the flanges 13 onto the areas thereof occupied by the respective profiles 15 and 17. Thus, one of the nozzles 18 in each instance directs coolant fluid, such as air, selectively directly against the associated profile, and the other of the nozzles 18 in each instance projects coolant fluid against the associated flange 13 selectively in the area thereof to which the base of the associated profile 15 or 17, as the case may be, is integrally attached in the extrusion. There is sufficient residual cooling effect from the coolant impinged against the profile areas of the flanges 13 to also effect cooling of the flanges 13. The dual cooling of the profiles 15 and 17 both by front-on impingement of the coolant and back or base-on impingement of the coolant assures that the profiles will be cooled substantially uniformly with the web 12 and the flanges 13 without wrinkling of the flanges 13 where the profiles are connected thereto, and permits high speed manufacture of the extruded construction 10.

Immediately after extrusion of the construction 10, the web 12 is collapsed along a diameter extending through the longitudinal center of the closure web area 14, and the area 14 is folded inwardly into gusset form along parallel fold lines 19 (FIG. 2) at juncture with the proximal ends of flanges 13. Thereby the flanges 13 are brought into close proximity to one another, and the profiles 15 and 17 are separably interlocked in coupled fastener relationship. The collapsed body of the web 12 beyond the junctures 19 provides bag body wall panels 20 having end parts joined to the extrusion adjacent to the profiles 15 and 17 through the fold lines 19, the folded gusset 14 extending between the panels 20 partway toward a terminal fold line juncture 21 connecting the panels 20.

After folding, the terminal fold line juncture 21 may be slit open along its length as shown in FIG. 3, and the wall panels 20 then turned away from each other into clearance relation to the infolded gusset 14, substantially as shown in FIGS. 4 and 5. Thereby, the gusset 14 is exposed for further processing as shown in FIG. 6, comprising the effecting of a fusion seal such as by electronic welding or heat sealing along a generally zigzag line in order to provide convergent edges 22 extending between the fold terminal of the gusset 14 and the junctures 19. This separates the gusset 14 into generally triangular sealed closure and funnel spout structure elements 23 which are of a base width substantially equivalent to the width of bags to be fabricated from the tubular structure. The portions of the gusset 14 outside of the sealed edges 22 are separated and discarded as scrap.

After the formation of the combination closure and funnel spout elements 23, the wall panels 20 are returned to their original positions with the elements 23 therebetween, as shown in FIG. 7. Then fusion seals 24 are formed along transverse lines extending entirely across the folded construction 10. Thereby the construction 10 is separated into individual container or bag units 25, which are fully hermetically sealed at one end by the funnel spout elements 23 and are open at their opposite ends so that they can be filled with any desired contents. After filling, the bag units 25 are fusion sealed along lines 27 (FIG. 8) across the formerly open ends, whereby the contents are hermetically sealed within the bags. By having the fastener 15,17 closed during filling of the bags 25 through their open ends, outward displacement of the sealed funnel pouring spout element 23 by imposition of the contents weight will be prevented. After the open ends of the bags 25 are sealed at 27, the contents are fully protected and isolated from externally located foreign elements, and are protected against unauthorized access. The bags can be handled without spilling the contents, and packing and shipping is facilitated. If for any reason the fastener 15,17 of any bag should separate due to pressures within the bag or for any other reason, the contents will not spill out because the bag will remain closed and sealed by virtue of its completely sealed element 23 formed from the integral gusset 14. The element 23 is of sufficient area so that it can absorb distortion of the bag walls and pressures and forces such as may occur when a substantial number of filled bags are packed for shipment or storage or the bags are roughly handled during packing or when unpacking.

It will be appreciated that if contents are to be packaged in the bags 25 which require a relatively large opening from the bag for removal of the contents, the infolded gusset 14 may be left untreated so that it will extend entirely across the bag and be sealed at its sides in the side seals 24 of the bag. In such a case, however, as no spout is necessary the depth of the fold may be reduced, thereby increasing the space available inside the bag for the contents to be placed inside of it. Where the contents are of a type which it is desirable to pour under controlled condition from the bag container, the triangular shape of the sealing funnel spout element 23 is desirable.

With either form of the closure gusset structure, when it is desired to remove contents, the flanges 13 are adapted to be grasped and pulled apart to separate the fastener elements 15, 17. This will also spread the infolded gusset structure which may then be opened easily by means of a knife or scissors which may be inserted into the infolded element while it is still in the generally infolded position; or after inverting the bag and permitting the contents load to push the element out of the bag opening, the top of the element may be cut off. An incision in or separation of only so much of the gusset need be made as necessary for the intended contents discharging purpose. For example, in the triangular element form 23 of the structure, after it has been projected from the bag substantially as shown in FIG. 9, the apex tip may be snipped off by a pair of scissors or merely torn off and the contents may then be controllably released by using the element as a metering funnel spout. After a desired quantity of material is released from the bag, the funnel element 23 may be pushed back into the interior of the bag and the fastener 15, 17 closed in the normal manner. Inasmuch as the extended spout element 23 intervenes between the contents and the fastener 15, 17, the rib and groove elements of the fastener remain free of the contents which may be powder or other material. Therefore, completely reliable resealing of the rib and groove fastener is facilitated.

Instead of forming the integral extruded construction initially with a tubular web as in FIG. 1, it may be more convenient or feasible to form an integral extruded construction 10' (FIG. 10) from suitable thermoplastic material in an extruder schematically identified as 11', having a die with a thin wide substantially straight die opening to provide a thin sheet, flat film or web 12'. On one side of the web 12' two substantially spaced, longitudinally extending, angularly projecting flange portions 13' of substantial width are integrally formed in the extrusion process. These flange portions 13' are adapted ultimately to provide separating or opening flanges in the product to be fabricated from the extruded construction 10'. In the flat extruded configuration of the web 12', the flanges 13' are disposed in generally parallel relation, with a substantial width bag closure, gusset web area 14' between the flanges, and with the web 12' extending a substantial distance on either side of the flanges 13'. On their opposing faces, the flanges 13' are provided with separable zipper type resiliently flexible fastener means comprising a male profile 15' integrally formed by extrusion on one of the flanges 13', and a receptive complementary female profile 17' integrally formed by extrusion on the other of the flanges 13'. A substantial width free portion of each of the flanges 13' extends outwardly beyond the respective profiles.

As extruded, the web 12' is cooled to maintain its form. In order to cool the profiles 15' and 17', nozzles 18' are provided, similarly as in FIG. 1, for impinging coolant from opposite sides of the flanges 13' onto the areas thereof occupied by the respective profiles 15' and 17'. One of the nozzles 18' in each instance directs coolant fluid such as air selectively directly against the associated profile, and the other of the nozzles 18' in each instance projects coolant fluid against the associated flange 13' selectively in the area thereof to which the base of the associated profile 15' or 17', as the case may be, is integrally attached in the extrusion.

Immediately after extrusion of the construction 10' it is collapsed at least to the extent of folding the gusset area 14' along a longitudinal center line in a direction away from the flanges 13' to provide a gusset between parallel fold lines 19', as shown in the dot dash outline in FIG. 10. At the same time the flanges 13' are brought into close proximity to one another and the profiles 15' and 17' separately interlocked in fastener relationship. The web 12' at each side of the flanges 13' may be immediately foldably collapsed to provide bag body wall panels 20', and then swung back into clearance relation to the gusset area 14', substantially in the same manner as described in connection with FIG. 4. Of course, if preferred the web panels 20' may be folded up toward one another alongside the flanges 13' at the same time that the gusset area 14' is folded in the opposite direction. In any event, such folding back of the panels 20' need by effected only if it is desired to form the folded gusset area 14' into triangular spout elements similarly as the spout elements 23 in FIG. 6. Then with the panels 20' folded down alongside the folded gusset area 14' the construction 10' may be fusion sealed along transverse lines similarly as depicted in FIG. 7 to provide individual bag units. After filling through open ends opposite the closure provided by the folded gusset areas 14', the open ends are adapted to be sealed similarly as described in connection with FIG. 8. Thereafter the bag units may be manipulated in the manner described in connection with FIG. 9.

Referring to FIG. 11, an integral extrusion construction 25 for bags is adapted to be formed by extrusion of suitable thermoplastic material similarly as described in connection with FIG. 1, extrudate being forced from an extruder, schematically identified as 27, through an annular die opening to provide a thin tubular film or web 28. The inside of the extruded tube may be pressurized by means of air to keep it from collapsing and to obtain cross grain orientation of the material. Integrally formed in the extrusion process are two substantially circumferentially spaced longitudinally extending, angularly radially outwardly projecting pull flange portions 29, each of which may have along its distal end edge a reinforcing and digital grasp facilitating bead 30. At their proximal ends, the flanges 29 are integral with the web 28 and are disposed in generally diverging relation at opposite sides of a flexible, collapsibly foldable bag closure gusset-forming web area 31. In this instance, separable zipper-type resiliently flexible fastener means are extruded integrally in one piece with the gusset area 31, comprising a male profile 32 adjacent to juncture of one of the flanges 29 with the web and a complementary female profile 33 integrally extruded with the gusset area 31 adjacent to the other of the flanges 29.

On completion of the extrusion, the web 28 is collapsed along a diameter extending through the longitudinal center of the gusset area 31, and the gusset area 31 is folded inwardly substantially as a gusset 34 (FIG. 12) along parallel fold lines 35 at juncture with the flanges 29. Thereby the flanges 29 are brought into close proximity to one another, and the profiles 32 and 33 are separably interlocked in coupled fastener relationship. The remainder of the collapsed body of the web 28 collapsibly enfolds the gusset 34 and provides bag body side wall panels 37. Both the side wall panels 37 and the gusset 34 may be handled in substantially the same manner as described for the finished extrusion 10 of FIGS. 1-9 to provide filled reclosable bags. By locating the fastener 32, 33 inwardly from the juncture 35, less strain on the separable fastener is imposed by unintentional separating stresses on the flanges 29, although the fastener is not quite as responsive to separation by pulling the flanges 29 apart when it is desired to open the bag, compared to the arrangement in FIG. 2, for example.

If preferred, the extruded construction may be made, as depicted in FIG. 13, by forming in an integral one piece extrusion a flexible collapsibly foldable thin wall plastic gusset-forming web area 38, a pair of pull flange portions comprising a pull flange 39 and a pull flange 40 of substantial width having proximal ends integral with opposite sides of the gusset area 38, and separable resiliently flexible interlocking complementary fastener profiles 41 and 42 respectively adjacent to the proximal end of the flange 39 and the proximal end of the flange 40. In this instance the profiles 41 and 42 are of the multiple hooked rib and groove type and are arranged to be interlockingly separably coupled together upon collapsibly folding the gusset web area 38, as shown in dash outline, away from the flanges 39 and 40.

To complete the bag configuration, the collapsibly folded gusset area 38 is desirably enveloped in a generally telescoped manner as a gusset 43 (FIG. 14) within a bag body having side wall panels 44 with upper ends 45 joined in sealed relation to the sides of the collapsibly folded gusset 43 adjacent to the profiles 41 and 42. As indicated in the dash outline in FIG. 14, the side wall panels 44 may be formed as an initially flat thin wall plastic web extrusion which is folded up to provide the bag body side walls 44. If preferred, a tubular extrusion may be split to provide the bag body. At its lower end 46, the bag body extrusion may be slit open similarly as described in connection with FIG. 3 for shaping the gusset 43 into pouring spout formation, or merely to fill the bag sections into which the structure is adapted to be formed. On the other hand, the side wall panels 44 may be provided as additional separate strip panels which after attachment as by suitable plastic fusion bonding to the gusset 43 provide an open bottom as indicated in dot dash outline, for bending back to facilitate shaping of the gusset 43 into pouring spout configuration and/or for filling bag sections of the completed structure.

In FIG. 15 the construction is similar to and may be made by substantially the same method as the construction in FIG. 14. Primed reference numerals represent the substantially equivalent elements as in FIG. 14, except that the fastener profile 41' comprises a double sided hooked male profile and the fastener profile 42' comprises a complementary generally arrowhead profile. Similarly as in FIG. 14, the flanges 39' and 40' have their proximal ends integral with the opposite sides of the gusset web area 38', the fastener profiles 41' and 42' are integral with the extrusion adjacent to the proximal ends of the flanges, and side wall panels 44' have their upper ends 45' joined as by suitable plastic bonding to the collapsibly folded gusset adjacent to the profiles 41' and 42'. If preferred, instead of extruding the blank for the combined gusset, pull flange and fastener profile structure in substantially the flat manner according to FIG. 13, the blank may be extruded in tubular fashion, indicated by the dash line connection of the tops of the flanges 39' and 40', and the tubular structure collapsed as shown to couple the fastener profiles 41' and 42' and the pendulous gusset 38' for generally telescoped disposition in the upper portion of the bag body.

On reference to FIG. 16 extrusion of a tubular combination bag closure gusset forming web area 50, pull flange forming area 51 and separable respective male and female profiles 52 and 53 by means of an extrusion die 54 is depicted. There is also depicted in FIG. 17 the forming of a tubular bag body extrusion 55 as by means of an extrusion die 57.

In FIG. 18 assembly of the extrusions formed according to FIGS. 16 and 17 into a bag 58 is depicted. For this purpose, the tubular extrusion of FIG. 16 is collapsed along a diameter extending midway between the spaced fastener profiles 52 and 53 within the tubular extrusion to couple the profiles and extend the gusset 52 as a pouch adapted to depend below the coupled profile fastener while the pull flange area which is collapsed to extend from the fastener in the opposite direction from the gusset 52 provides respective pull flange portions 59 and 60. To envelope the gusset in the mouth end portion of the bag 58, the tubular bag body extrusion 55 may be split longitudinally so that the gusset 50 projects into the bag body between side wall panels 61 and 62. Edge portions 63 and 64 of the split tubular bag extrusion are adapted to be sealingly secured as by fusion bonding to the pull flange portions 59 and 60, respectively. This provides a double thickness for the pull flanges. In the finished bag, if preferred, the portion of the tubular gusset extrusion which in the extrusion connects the flange portions 59 and 60 may be left whole until it is desired to open the bag whereupon it may be trimmed away as indicated in dash outline, although if preferred that connecting portion may be trimmed away when finishing the bag. Of course, if it is preferred to make the bag body extrusion 55 and/or the combination gusset, fastener and pull flange extruded from originally substantially flat extruded material, the edge areas 63 and 64 of the bag body material may nevertheless be substantially matched with and seal bonded to the flange portions 59 and 60 and the resulting structure will be laminar stiffened double thickness pull flanges at the mouth of the bag 58.

To attain utmost security against unauthorized opening of the bag and/or to maintain the unopened bag in a condition of utmost security against leakage, a bag structure 65 as shown in FIG. 19 may be constructed utilizing the tubular extrusions of FIGS. 16 and 17. In this arrangement the combination gusset, fastener and pull flange tubular construction is entirely enclosed within the mouth end portion of the collapsed bag body extrusion 55, with the top end portion of the collapsed bag body extrusion 55 providing a closure cap 67 which may arch in spaced relation over the closed end of the pull flange area 51 as shown in full outline, or may be nested as shown in dash outline. Then, for double sealing security, the upper end bag body wall portions 63 and 64 may be secured by suitable seal bonding such as fusion bonding to the pull flange portions 59 and 60 above the coupled fastener profiles 52 and 53, and the bag side wall panels 61 and 62 may also be attached by seal bonding to the sides of the gusset 50 adjacent to the fastener profiles, as shown at 68. Of course, if circumstances warrant, the seal bonding 68 may be omitted and attachment effected only between the upper end portions 63 and 64 and the pull flange portions 59 and 60. At the lower ends of the bags 58 and 65, the collapsed body extrusion 55 may remain closed if the bags are to be filled by side filling technique. On the other hand, where it is preferred to effect bottom end filling, the bag body extrusion 55 may be split open and sealed closed after the filling operation.

It will be understood that variations and modifications may be effected without departing from the spirit and scope of the novel concepts of this invention.

I claim as my invention:

1. A method of making an extruded construction for bags, comprising:
    forming in a one piece extrusion a flexible collapsibly foldable thin wall closure web area joined at its opposite ends to proximal ends of a pair of pull flange portions of substantial length, and as part of the extrusion forming separable resiliently flexible interlocking complementary fastener profiles adjacent to said proximal ends;
    collapsibly folding the closure web area away from the flange portions and the profiles;
    coupling the fastener profiles together;
    and enveloping the collapsibly folded closure web area within bag body side wall panels having end parts joined to the extrusion adjacent to the profiles.

2. A method according to claim 1, comprising sealing the closure web area as a gusset along inwardly convergent lines into a combination sealing and funnel pouring spout element.

3. A method according to claim 1, comprising forming said bag body side wall panels as an integral part of a tubular form of said one piece plastic extrusion, collapsing the tubular extrusion to provide said bag side wall panels and thereby enveloping the folded closure web area as a gusset, separating said wall panels along a juncture line spaced from said gusset, turning said wall panels back over said pull flange portions to expose said gusset, forming said gusset into a series of pouring funnel spout elements, returning said wall panels to their original position, and forming seals transversely across the collapsed tubular extrusion between the funnel elements to provide bag sections.

4. A method according to claim 1, comprising forming said closure web area and said bag body side wall panels as an integral part of a substantially flat sheet form of said one piece plastic extrusion, foldably collapsing the flat sheet form closure web area into a gusset, forming the gusset into a series of pouring funnel spout elements, folding the side wall panels to envelop the funnel spout elements, and forming seals transversely across the bag body side wall panels between the funnel elements to provide bag sections.

5. A method according to claim 1, comprising forming seals transversely across the bag body side wall panels to provide bag sections having openings opposite the closure web area, filling the bag sections through said openings, and then sealing edges of the panels at the bag openings together to provide closed bag containers.

6. A method according to claim 1, comprising extruding said fastener profiles integrally with said pull flange portions spaced from said proximal ends of the pull flange portions.

7. A method according to claim 1, comprising extruding said fastener profiles integrally with said closure web area adjacent to but separate from said proximal ends of the pull flange portions.

8. A method according to claim 1, comprising extruding said fastener profiles integrally with said pull flange portions and said web area at said proximal ends.

9. A method according to claim 1, comprising integrally extruding said bag body side wall panels with said closure web area.

10. A method according to claim 1, comprising forming said bag body side wall panels separately from said integral extrusion and sealing said wall panel end parts to the collapsibly folded closure web area.

11. A method according to claim 1 compromising forming said integral extrusion tubularly with said fastener profiles on the inside of the tube, collapsing the tube and coupling the fastener extrusions, and thereafter joining the end parts of said wall panels to the extrusion.

12. A method according to claim 1, comprising joining the end parts of said wall panels in laminar relation to said pull flange portions whereby to provide double thickness in the pull flanges.

13. A method according to claim 1, comprising forming said bag body side wall panels separately from said integral extrusion, and sealing said wall panel ends to the pull flange portions.

14. A method according to claim 13, comprising also sealing said wall panels to said closure web area.

15. A method according to claim 1, comprising forming said bag body side wall panels in a tubular extrusion, collapsing the tubular extrusion, and enveloping said one piece extrusion within one end portion of the collapsed tubular extrusion and therein effecting joinder of the wall panel end parts to said integral extrusion.

16. A method according to claim 15, comprising also extruding said integral extrusion tubularly, and collapsing the tubular integral extrusion within a collapsed tubular bag body extrusion.

17. A method according to claim 1, comprising forming said extrusion tubularly including integrally extruding said bag body side wall panels with said closure web area and forming said pull flange portions to project axially outwardly relative to the tubular extrusion.

18. A method according to claim 17, comprising extruding said fastener profiles integrally on the pull flange portions.

19. A method according to claim 17, comprising extruding said profiles integrally with the closure web area.

20. A method of making an extruded construction for bags, comprising:

forming in a one piece extrusion a flexible collapsibly foldable thin wall closure web area joined at its opposite ends to proximal ends of a pair of pull flange portions of substantial length, and as part of the extrusion forming separable resiliently flexible interlocking complementary fastener profiles adjacent to said proximal ends;

immediately after forming of the extrusion applying coolant selectively directly to the profiles;

also applying coolant selectively to those parts of the extrusion to which the bases of the profiles are integrally joined;

collapsibly folding the closure web area away from the flange portions and the profiles;

coupling the fastener profiles together;

and enveloping the collapsibly folded closure web area within bag body side wall panels having end parts joined to the extrusion adjacent to the profiles.

21. A method according to claim 20, comprising applying the coolant from nozzles directly in opposition to one another toward the profiles at opposite faces of the areas of the extrusion carrying said profiles.

22. A method according to claim 20, comprising extruding said profiles integrally on said pull flange portions and applying the coolant from nozzles directed in opposition to one another in line with said profiles at opposite sides of the flange portions.

* * * * *